Patented June 23, 1953

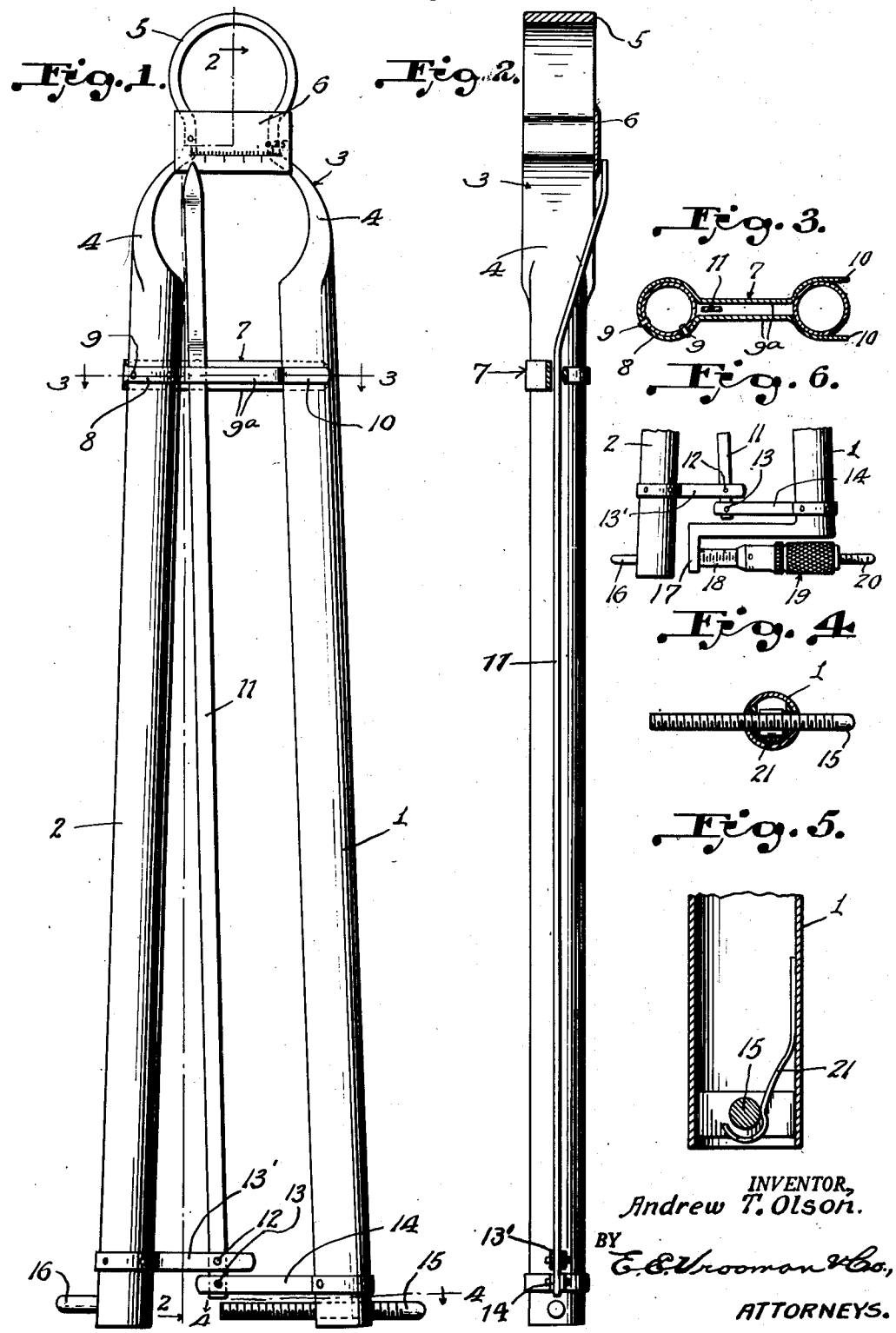

2,642,665

UNITED STATES PATENT OFFICE 2,642,665

CYLINDER GAUGE

Andrew T. Olson, Fargo, N. Dak.

Application April 27, 1951, Serial No. 223,281

2 Claims. (Cl. 33—148)

This invention relates to a cylinder gage.

An object of this invention is the production of an efficient gage for determining the amount of wear in motor vehicles cylinders.

Another object of this invention is the production of a gage that will enable the operator to easily determine the slightest variation in cylinder bores, if tapered or out of round.

A still further object is the production of a cylinder gage which is durable in construction and simple in operation, and which is comparatively inexpensive to manufacture.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a front view of a cylinder gage constructed in accordance with this invention, while Figure 2 is a side view of the same.

Figure 3 is a sectional view, taken on line 3—3, Figure 1, and looking in the direction of the arrows.

Figure 4 is a sectional view, taken on line 4—4, Figure 1, and looking in the direction of the arrows.

Figure 5 is an enlarged fragmentary sectional view of the primary leg.

Figure 6 is a fragmentary view of another embodiment of the cylinder gage, showing part of a micrometer attached to the primary leg.

Referring to the drawings, Figures 1 to 5 show the preferred species of this invention.

The gage or device comprises a primary leg 1 and an auxiliary leg 2. A yoke 3 is capable of a springy action and is integral with the upper ends of said legs 1 and 2. This yoke is of a double semicircular loop shape, including lower curved sections 4, terminating at their outer ends in a semi-loop handle 5.

A scale plate 6 is fastened to the lower or inner part of handle 5. Each graduation on scale plate 6 represents one-thousandth of an inch. The scale plate 6, being fastened to the handle 5, does not interfere with the movement of the legs 1 and 2.

A pointer guide 7 is employed. This guide comprises a round body 8, which surrounds and is fixed to the auxiliary leg 2, and is fastened to said leg by means of rivets 9. Two parallel arms 9a extend from body 8, Fig. 3, and these arms are provided on their outer ends with straight clamping jaws 10 Fig. 1, which partly surround the primary leg 1. The movable pointer 11 is mounted between the arms 9a.

The movable pointer 11 is pivotally mounted at 12 and 13 upon the auxiliary and primary brackets 13¹ and 14, respectively. These brackets are fixedly secured to the legs 1 and 2.

A primary threaded pointer 15 is mounted upon the primary leg 1, and a fixed auxiliary contact pointer 16 is mounted upon the auxiliary leg 2.

In Fig. 6, I have shown a modified form comprising an L-shaped bracket 17 integral with the lower end of leg 1. Fixedly secured to this bracket 17 is a scale unit 18, upon which is mounted a micrometer hub 19. On hub 19 is a contact pointer 20.

My gage is adjusted only once. In operation, the gage is moved up and down and rotated until the widest place of bore is located, then contact point 15, Fig. 1, is adjusted to fit the bore at this place, Fig. 1. It is then necessary only to check sweep of the gage pointer when gage is moved up and down and rotated in the bore. If the gage pointer swings from 0 to 10, there is a variation of ten-thousandths of an inch in cylinder bore. Then if it is necessary to determine the actual diameter of the bore at the widest place in cylinder, simply check gage points with the micrometers with gage pointer at 0. The smallest diameter is determined in the same manner, or by adjusting micrometer to hold gage pointer at 10, or by deducting .010" from the micrometer readings.

While I have described the preferred embodiments of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

In Figure 5, I have shown how a spring 21 may be secured in the primary leg 1, bearing against the primary pointer 15, and acting as a brake to prevent the said pointer from accidentally rotating upon the leg 1.

What I claim is:

1. In a device of the class described, the combination of a primary and an auxiliary leg, a yoke including spring sections and a semi-loop handle integral with the upper ends of said legs, a scale plate fastened to said handle, a guide fixedly secured at one end to said auxiliary leg, said guide extending to and partly surrounding said primary leg, a pointer slibably mounted in said guide, a pair of overlapping brackets on the lower ends of said legs, means pivotally connecting said pointer to said brackets, a fixed pointer and an adjustable pointer below said brackets and on the lower ends of said legs, said adjustable pointer being threaded through one of the legs, and spring means within the leg through which the adjustable pointer passes engaging said pointer to resist rotative movement thereof.

2. In a device of the class described, the combination of a primary and an auxiliary leg, a yoke comprising spring sections integral with the upper ends of said legs, said yoke also including an integral handle, a flat plate riveted to the inner end of said handle, a pointer guide secured to said auxiliary leg, said guide including two spaced parallel arms, said arms provided at their outer ends with clamping jaws partly around said primary leg, said legs provided near their lower ends with parallel and overlapping brackets, a movable pointer and means pivotally connecting said pointer to the outer ends of said brackets, said movable pointer working between the arms of said guide and registering with said scale plate, a fixed contact pointer on the lower end of said auxiliary leg, and a threaded contact pointer threaded through the lower end of said primary leg for a screw adjustment thereof, and a leaf spring fixed within the primary leg and having an arcuate portion extending around said threaded contact pointer and constituting a brake resisting rotation thereof.

ANDREW T. OLSON.

References Cited in the file of this patent

UNITED STATES PATENTS

| Number | Name | Date |
|---|---|---|
| 2,332,010 | Pike | Oct. 19, 1943 |
| 2,522,030 | Fuqua | Sept. 12, 1950 |

FOREIGN PATENTS

| Number | Country | Date |
|---|---|---|
| 1,797 | Great Britain | Jan. 25, 1909 |
| 105,488 | Great Britain | Apr. 19, 1917 |
| 439,557 | France | Apr. 12, 1912 |
| 546,877 | France | Sept. 15, 1922 |